United States Patent
Sivagnanenthirarajah et al.

(10) Patent No.: US 12,307,266 B2
(45) Date of Patent: May 20, 2025

(54) METHOD FOR PRIORITIZING HUMAN PRESENCE SENSORS IN A COMPUTER SYSTEM BASED ON ARBITRATION POLICIES

(71) Applicant: Microsoft Technology Licensing, LLC, Redmond, WA (US)

(72) Inventors: Ugan Sivagnanenthirarajah, Seattle, WA (US); Michael Jeffrey Ajax, Redmond, WA (US); Sathyanarayanan Karivaradaswamy, Sammamish, WA (US); Robert Eugene Harris, Jr., Woodinville, WA (US); Sayak Chatterjee, Seattle, WA (US); Sarah Anne Barnette, Seattle, WA (US); Sanjana Ramakrishnan Sunder, Redmond, WA (US); Sanjeev Chandra Reddy, Redmond, WA (US); Sergii Viktorovych Liashenko, Edmonds, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 35 days.

(21) Appl. No.: 18/327,719

(22) Filed: Jun. 1, 2023

(65) Prior Publication Data

US 2024/0256021 A1 Aug. 1, 2024

Related U.S. Application Data

(60) Provisional application No. 63/482,501, filed on Jan. 31, 2023.

(51) Int. Cl.
*G06F 1/26* (2006.01)
*G06F 9/4401* (2018.01)
*G06F 9/445* (2018.01)

(52) U.S. Cl.
CPC ............ *G06F 9/44526* (2013.01); *G06F 1/26* (2013.01); *G06F 9/4401* (2013.01)

(58) Field of Classification Search
CPC ........ G06F 1/32; G06F 1/3206; G06F 1/3231; G06F 1/3234; G06F 1/26; G06F 9/44526; G06F 9/4401
See application file for complete search history.

(56) References Cited

U.S. PATENT DOCUMENTS 10,819,920 B1 * 10/2020 Hamlin ................. G06F 1/1686
2006/0192775 A1    8/2006 Nicholson et al.
(Continued)

FOREIGN PATENT DOCUMENTS

CN            102306047 A       1/2012

OTHER PUBLICATIONS

International Search Report and Written Opinion received for PCT Application No. PCT/US2024/010383, May 28, 2024, 22 pages.
(Continued)

*Primary Examiner* — Raymond N Phan
(74) *Attorney, Agent, or Firm* — Workman Nydegger

(57) ABSTRACT

A computer system receives a sensor payload from a human presence sensor that is associated with the computer system. The computer system determines, based on an arbitration policy, that the computer system is enabled to perform a particular action based on the priority of the human presence sensor. The arbitration policy determines the priority of the human presence sensor among a plurality of human presence sensors that are associated with the computer system. The computer system triggers the particular action based on the computer system being enabled to perform the particular action based on the content of the sensor payload.

20 Claims, 12 Drawing Sheets

(56) References Cited

U.S. PATENT DOCUMENTS

| | | |
|---|---|---|
| 2012/0173682 A1 | 7/2012 | Mantere et al. |
| 2012/0233272 A1 | 9/2012 | Bedi |
| 2014/0156228 A1 | 6/2014 | Molettiere et al. |
| 2017/0132794 A1 | 5/2017 | Lee |
| 2017/0193282 A1 | 7/2017 | Valko et al. |
| 2020/0012331 A1 | 1/2020 | De Cesare et al. |
| 2020/0026342 A1 | 1/2020 | Sengupta |
| 2020/0133374 A1* | 4/2020 | Sinha .................. G06F 3/013 |
| 2022/0075929 A1 | 3/2022 | Booth et al. |
| 2022/0319300 A1 | 10/2022 | Stewart et al. |
| 2023/0335287 A1 | 10/2023 | Miller et al. |

OTHER PUBLICATIONS

Notice of Allowance mailed on May 8, 2024, in U.S. Appl. No. 18/326,734, 08 pages.

"Non Final Office Action Issued in U.S. Appl. No. 18/326,734", Mailed Date: Oct. 26, 2023, 10 Pages.

U.S. Appl. No. 63/482,501, filed Jan. 31, 2023.

U.S. Appl. No. 18/326,734, filed May 31, 2023.

International Search Report and Written Opinion received for PCT Application No. PCT/US2024/010382, Apr. 4, 2024, 14 pages.

Invitation to Pay Additional Fees received for PCT Application No. PCT/US2024/010383, Apr. 4, 2024, 15 pages.

"CreateRestrictedToken function (securitybaseapi.h)", Retrieved From: https://learn.microsoft.com/en-us/windows/win32/api/securitybaseapi/nf-securitybaseapi-createrestrictedtoken, Oct. 13, 2021, 6 Pages.

"DuplicateTokenEx Function (securitybaseapi.h)", Retrieved From: https://learn.microsoft.com/en-us/windows/win32/api/securitybaseapi/nf-securitybaseapi-duplicatetokenex, Oct. 13, 2021, 4 Pages.

"HID Sensors Usages", In Whitepaper of Microsoft, Oct. 22, 2015, 163 Pages.

"Microsoft Privacy Statement", Retrieved From: https://privacy.microsoft.com/en-US/privacystatement, Feb. 2023, 9 Pages.

"PoRegisterPowerSettingCallback function (ntifs.h)", Retrieved From: https://learn.microsoft.com/en-us/windows-hardware/drivers/ddi/ntifs/nf-ntifs-poregisterpowersettingcallback, Oct. 22, 2021, 5 Pages.

"Send feedback to Microsoft with the Feedback Hub App", Retrieved From: https://support.microsoft.com/en-us/windows/send-feedback-to-microsoft-with-the-feedback-hub-app-f59187f8-8739-22d6-ba93-f66612949332, Retrieved on: Nov. 18, 2022, 9 Pages.

"SetTokenInformation function (securitybaseapi.h)", Retrieved From: https://learn.microsoft.com/en-us/windows/win32/api/securitybaseapi/nf-securitybaseapi-settokeninformation, Oct. 13, 2021, 3 Pages.

Abzarian, et al., "HID Usage Tables for Universal Serial Bus (USB)", Retrieved From: https://www.usb.org/sites/default/files/hut1_21_0.pdf, Oct. 12, 2020, 319 Pages.

Berrendonner, et al., "Busiotools", Retrieved From: https://github.com/microsoft/busiotools/blob/master/sensors/racing/README.md, Jan. 13, 2023, 2 Pages.

Golden, et al., "Camera Privacy Shutters and Kill Switches", Retrieved From: https://learn.microsoft.com/en-us/windows-hardware/drivers/stream/camera-privacy-controls, Jan. 20, 2023, 16 Pages.

Golden, et al., "Privacy Shutter/Switch Notification", Retrieved From: https://learn.microsoft.com/en-us/windows-hardware/drivers/stream/privacy-shutter-notification, Jun. 30, 2022, 6 Pages.

Graff, et al., "Windows Hardware Compatibility Program", Retrieved From: https://learn.microsoft.com/en-us/windows-hardware/design/compatibility/, Jun. 25, 2021, 1 Page.

Hopkins, et al., "Introduction to the Sensor and Location Platform in Windows", Retrieved From: https://learn.microsoft.com/en-us/windows-hardware/drivers/sensors/, Jan. 20, 2022, 4 Pages.

Hopkins, et al., "Proximity Sensor Data Fields", Retrieved From: https://learn.microsoft.com/en-us/windows-hardware/drivers/sensors/proximity-sensor-data-fields?redirectedfrom=MSDN, Mar. 3, 2023, 2 Pages.

Hudek, et al., "Manufacturing Windows Engineering Guide (WEG)", Retrieved From: https://learn.microsoft.com/en-us/windows-hardware/manufacture/desktop/manufacturing-windows-engineering-guide?view=windows-11, Feb. 17, 2023, 23 Pages.

Northrup, et al., "Display Settings Overview", Retrieved From: https://learn.microsoft.com/en-us/windows-hardware/customize/power-settings/display-settings, Apr. 21, 2020, 2 Pages.

Smith, et al., "Dim Display Brightness", Retrieved From: https://learn.microsoft.com/en-us/windows-hardware/customize/power-settings/display-settings-dim-display-brightness, Apr. 11, 2020, 1 Page.

Smith, et al., "Sensors Power Management", Retrieved From: https://learn.microsoft.com/en-us/windows-hardware/design/device-experiences/sensors-power-management-for-modern-standby-platforms, May 3, 2021, 16 Pages.

Viviano, et al., "Hardware Support App (HSA): Steps for App Developers", Retrieved From: https://learn.microsoft.com/en-us/windows-hardware/drivers/devapps/hardware-support-app-hsa--steps-for-app-developers, Dec. 15, 2021, 6 Pages.

Wojciakowski, et al., "Sensors", Retrieved From: https://learn.microsoft.com/en-us/windows/uwp/devices-sensors/sensors, Oct. 21, 2022, 9 Pages.

Hudek, et al., "Unattended Windows Setup Reference", Retrieved From: https://learn.microsoft.com/en-us/windows-hardware/customize/desktop/unattend/, Jun. 25, 2021, 2 Pages.

"Manage App Permissions for your Camera in Windows", Retrieved From: https://support.microsoft.com/en-us/windows/manage-app-permissions-for-your-camera-in-windows-87ebc757-1f87-7bbf-84b5-0686afb6ca6b, Retrieved on: Nov. 18, 2022, 3 Pages.

"Windows Camera, Microphone, and Privacy", Retrieved From: https://support.microsoft.com/en-us/windows/windows-camera-microphone-and-privacy-a83257bc-e990-d54a-d212-b5e41beba857, Retrieved on: Nov. 18, 2022, 8 Pages.

* cited by examiner

| Integrated Sensor | External Sensor | Policy |
|---|---|---|
| No | None | Wake and lock features are not present / disabled |
| Yes | None | If the sensor is inactive, wake and lock features are disabled and not function |
| Yes | Single | The externally connected sensor becomes the default selected sensor for wake and lock features. A user has the option to configure which sensor they prefer via a user interface |
| No | Single | The externally connected sensor becomes the default selected sensor for wake and lock features. A user has the option to configure which sensor they prefer via a user interface |
| Yes | Multiple | The same user option is presented in the user interface. The sensor that was last connected to the system will be the default sensor until the user chooses another option |
| No | Multiple | The same user option is presented in the user interface. The sensor that was last connected to the system will be the default sensor until the user chooses another option |

Privacy & Security > Presence sensing        700

The settings on this page do not prevent you from utilizing wake and lock features with presence sensing. Some desktop apps might not appear on this page or be affected by these settings. Learn more about presence sensing

 Presence sensing access
Anyone using this device can choose if their apps have presence sensing access when this is on    On  — 701

 Let apps access presence sensing
Anyone using this device can choose if their apps have presence sensing access when this is on    On  ∧

 Sensor Explorer
Last Accessed 12/20/2022 | 8:01 PM    On 

 Camera    Off 

 Store
Last Accessed 01/01/2023 | 10:02 AM    On 

 Photos
Last Accessed 01/11/2023 | 9:06 AM    On 

— 702

Let destop apps access presence sensing
Desktop apps that have previously accessed presence sensing are listed here    On 

 Host Process
Last Accessed 01/12/2023 | 1:02 PM

 Video Conferencing
Last Accessed 01/10/2023 | 10:22 AM

— 703

 Recent activity
See which apps have accessed sensing in the last 7 days    6 requests  — 704

Related Settings

 Presence sensing settings
Let the OS automatically lock, wake, or dim your device    > — 705

 Privacy resources
About these settings and your privacy | Privacy dashboard | Privacy Statement

*FIG. 7*

METHOD FOR PRIORITIZING HUMAN PRESENCE SENSORS IN A COMPUTER SYSTEM BASED ON ARBITRATION POLICIES

CROSS-REFERENCE TO RELATED APPLICATIONS

This application claims priority to, and the benefit of, U.S. Provisional Patent Application Ser. No. 63/482,501, filed Jan. 31, 2023, and entitled "PRESENCE SENSOR EXTENSIONS," the entire contents of which are incorporated by reference herein in their entirety.

BACKGROUND

Computer systems often react to data signals obtained from sensor devices. For example, a human presence sensor, referred to as a "presence sensor" herein, is any hardware that can detect one or more human's distance from a computing device or that can detect indications that one or more humans intend to interact with the computing device. When a presence sensor is available to a computing device, that computing device can react to human presence in a variety of ways, such as by turning the device's screen off automatically when a user is detected as leaving, by waking the device when a user is detected as approaching, etc. Computer systems can interact with, and react to, a wide variety of other types of sensor devices, such as light sensors (e.g., camera, photodiode), sound sensors (e.g., microphone), acceleration sensors (e.g., accelerometer), device orientation sensors (e.g., gyroscope), velocity sensors, magnetic field sensors (e.g., compass), and the like.

The subject matter claimed herein is not limited to embodiments that solve any disadvantages or that operate only in environments such as those described supra. Instead, this background is only provided to illustrate one example technology area where some embodiments described herein may be practiced.

SUMMARY

In some aspects, the techniques described herein relate to methods, systems, and computer program products, including receiving a sensor payload from a human presence sensor that is associated with the computer system; determining, based on an arbitration policy, that the computer system is enabled to perform a particular action based on a priority of the human presence sensor, wherein the arbitration policy determines the priority of the human presence sensor among a plurality of human presence sensors that are associated with the computer system; and triggering the particular action based on the computer system being enabled to perform the particular action based on content of the sensor payload.

In some aspects, the techniques described herein relate to methods, systems, and computer program products, including receiving a set request from a first application, the set request specifying a value of a presence-sensing setting; initiating a callback to a second application, the callback indicating a presence-sensing settings modification; receiving a get request from the second application initiating the callback; and providing the second application with the value of the presence-sensing setting.

In some aspects, the techniques described herein relate to methods, systems, and computer program products, including identifying a first request from a first application for access to a human presence sensor; determining that the first application possesses a presence sensor capability; granting, to the first application, access to the human presence sensor; identifying a second request from a second application for access to the human presence sensor; determining that the second application lacks the presence sensor capability; and denying, from the second application, access to the human presence sensor.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described supra is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which:

FIG. 3 illustrates an example of an arbitration policy for different human presence sensor configurations.

FIG. 7 illustrates an example of a settings user interface for human presence sensing privacy.

DETAILED DESCRIPTION

Figure 1:
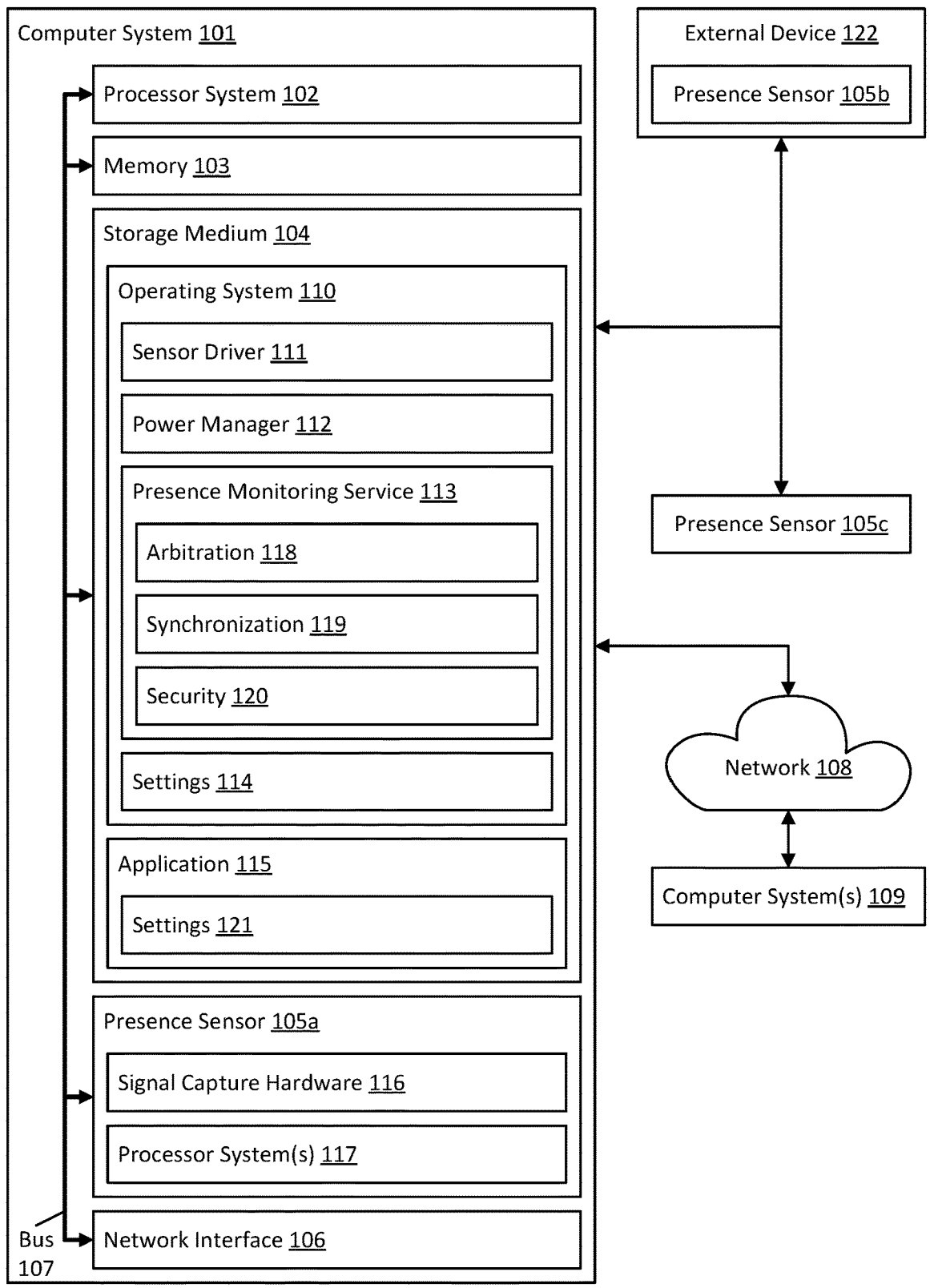
FIG. 1 illustrates an example of a computer architecture that facilitates native support for human presence sensors by an operating system (OS).

Conventionally, operating system (OS) support for sensor devices, such as presence sensors, was limited. This led to a patchwork of hardware and software solutions from various independent hardware vendors (IHVs) and original equipment manufacturers (OEMs) to integrate sensors into their devices. This, in turn, resulted in a lack of uniformity in how sensors were utilized and how related functionality was configured, leading to inconsistency in implementation and interoperability. The embodiments herein are directed to native OS support for sensors, such as presence sensors, as well as mechanisms for sensors to intervene in OS actions and decisions.

Currently, presence sensors have had a limited ability to trigger computer system actions. For example, previously, presence sensors were only able to wake a computer system from "lighter" low-power states, such as the "modern standby" power state of the WINDOWS OS from MICROSOFT CORPORATION of Redmond, Washington. Such power states provide an instant-on/instant-off user experience, including a low-power idle that enables the system to perform work and stay connected to a network while in the low-power state. A challenge to enabling presence sensors to have a greater ability to trigger computer system actions is that a computer system may have more than one presence sensor, and the set of presence sensors available to a computer system can vary over time. For example, a laptop computer may possess one or more integrated presence sensors, but that laptop computer may have additional presence sensors available to it from time to time as it is interfaced with docks, external monitors, external cameras, etc.

When the available number, identity, and arrangement of presence sensors varies over time, current OSs cannot dynamically determine which presence sensor to use to trigger a computer system activity, such as a wake from a low-power state. For example, a current OS may provide a drop-down selector that enables the selection of a single presence sensor from among multiple available presence sensors, which is an unsatisfactory user experience. For example, if an end-user selects a non-optimal sensor in a given scenario, the computer system may wake unintentionally. Because the state transition is quick and the additional amount of power consumed by the wake may be relatively small, the negative effects of waking a computer system from a "lighter" low-power state (e.g., modern standby) based on a presence sensor when waking may not be preferred, has been deemed to be acceptable. However, the negative effects of waking a computer system from a "deeper" low-power state (e.g., a "System Power State 3" (S3) state) or even a hibernate state (e.g., a "System Power State 4" (S4) state) based on a presence sensor can be substantial both in terms of the amount of time it takes for the state transition to complete and the additional amount of power consumed by waking from such a deeper low-power state.

As part of native OS support for presence sensors, the embodiments described herein are directed to a presence sensor arbitration process that dynamically arbitrates between multiple presence sensors to determine when a presence sensor can be used to trigger a computer system activity, such as a wake from a deeper low-power state (e.g., an S3 or an S4 state). This presence sensor arbitration process enables a computer system to adapt to a dynamically-changing set of available presence sensors while enabling enhanced cooperation between those presence sensors and the computer system's OS (e.g., by enabling the OS to use presence sensors to wake the computer system from a deeper low-power state, such as S3 or S4)

Further, as part of native OS support for presence sensors, the embodiments described herein are further directed to a settings synchronization architecture and process that enables OS-level presence sensor settings to be synchronized with a third-party application (e.g., an application supplied by a vendor that is different from a vendor of the OS) that includes presence sensor settings. This improves an end-user experience by enabling the end-user to view and change presence sensor settings from either an OS-level settings application or from a third-party settings application while ensuring continuity between the two applications.

Still further, as part of native OS support for presence sensors, the embodiments described herein are further directed to a security architecture and process that enables an end-user to configure access to presence sensor data on a per-application basis. This improves end-user security and transparency by providing the end-user the ability to individually restrict which applications can access presence sensor data and by providing the end-user visibility into which applications are accessing presence sensor data.

FIG. 1 illustrates an example of a computer architecture 100 that demonstrates native support for sensors by an OS. As shown, computer architecture 100 includes a computer system 101 comprising a processor system 102 (e.g., one or more central processing units (CPUs), one or more graphics processing units (GPUs), one or more neural processing units (NPUs)), memory 103 (e.g., system or main memory), a storage medium 104 (e.g., one or more computer-readable storage media), all interconnected by a bus 107. Computer architecture 100 also includes presence sensors 105 (e.g., a plurality of integrated or external presence sensors). For example, presence sensors 105 can include presence sensor 105a, which is integrated into computer system 101 (e.g., within a laptop lid); presence sensor 105b, which is part of an external device 122 (e.g., an external monitor); and presence sensor 105c, which is a standalone device. As shown, computer system 101 may also include a network interface 106 (e.g., one or more network interface cards) for interconnecting (via a network 108) to computer system(s) 109 (e.g., a single computer system or a plurality of computer systems).

As demonstrated within presence sensor 105a, in embodiments, one or more of the presence sensors 105 comprises signal capture hardware 116 that captures data signal(s) relating to objects external to computer system 101. As examples, signal capture hardware 116 may include a photodiode (luminosity signals), a camera (visual signals), a microphone (audio signals), a radio such as BLUETOOTH or WI-FI (radio signals), an accelerometer (inertial signals), a gyroscope (special orientation signals), a compass (magnetic field signals), and the like.

In some embodiments, one or more of the presence sensors 105 also comprises a processor system 117 that processes a data signal captured by signal capture hardware 116 to produce an analysis of the data signal. In these embodiments, processor system 117 processes a data signal captured by signal capture hardware 116 to produce a determination of a human presence state (e.g., present, not present, attentive, non-attentive, arriving, leaving). In these embodiments, an output of one or more of the presence sensors 105 is a determined human presence state (e.g., present or not, engaged or not). Examples of processor system 117 include a CPU, a GPU, an NPU, a microcontroller unit (MCU), and a field-programmable gate array (FPGA).

In other embodiments, processor system 102 processes a data signal captured by signal capture hardware 116. For example, processor system 102 analyzes a data signal captured by signal capture hardware 116 to determine a human presence state (e.g., present, not present, arriving, leaving, attentive, non-attentive). In these embodiments, an output of one or more of the presence sensors 105 is raw data signals (e.g., visual signals, audio signals, radio signals). In embodiments, one or more of the presence sensors 105 operates according to a human interface device (HID) application programming interface (API).

Depending on the sophistication of signal capture hardware 116 and processor system 117 (or the sensor's use of processor system 102), presence sensors 105 can produce a wide variety of actionable data. For example, presence sensors are grouped into general categories based on their capabilities. In embodiments, the presence sensor is a category one presence sensor. A "category one" presence sensor implements facial presence detection, which includes scanning to detect a face and providing a bounding box around the face (e.g., a bounding box within a video frame). In some embodiments, facial presence detection detects faces only, without distinguishing one face from another face or predicting or classifying facial attributes. In embodiments, the presence sensor is category two presence sensor. A "category two" presence sensor implements people identification and/or people tracking, which detects and tracks individual movements that identify the presence of one or more humans. In embodiments, the presence sensor is a multi-person detection sensor, which enables privacy alerting when multiple humans are detected. In embodiments, the presence sensor is an attention awareness sensor, which enables the detection of a user's intent or attention (e.g., by tracking a user's gaze).

Storage medium 104 is illustrated as storing computer-executable instructions implementing an OS 110 that includes native support for presence sensors. As shown in computer architecture 100, OS 110 includes a sensor driver 111. In some embodiments, sensor driver 111 is an HID sensor class driver. In some embodiments, sensor driver 111 obtains raw data signals from one or more of the presence sensors 105 and orchestrates the processing of that information at processor system 102. In other embodiments, sensor driver 111 obtains an analysis that is produced by processor system 117, based on processor system 117 having processed raw data signals. Regardless of how sensor driver 111 obtains an analysis of sensor data signals, in embodiments, sensor driver 111 generates a sensor payload for consumption by OS 110.

As shown in FIG. 1, OS 110 includes a power manager 112 and a presence monitoring service 113. In embodiments, presence monitoring service 113 processes payloads obtained from sensor driver 111. In embodiments, power manager 112 takes one or more actions based on determinations made by the processing of these sensor payloads by presence monitoring service 113.

Figure 2:
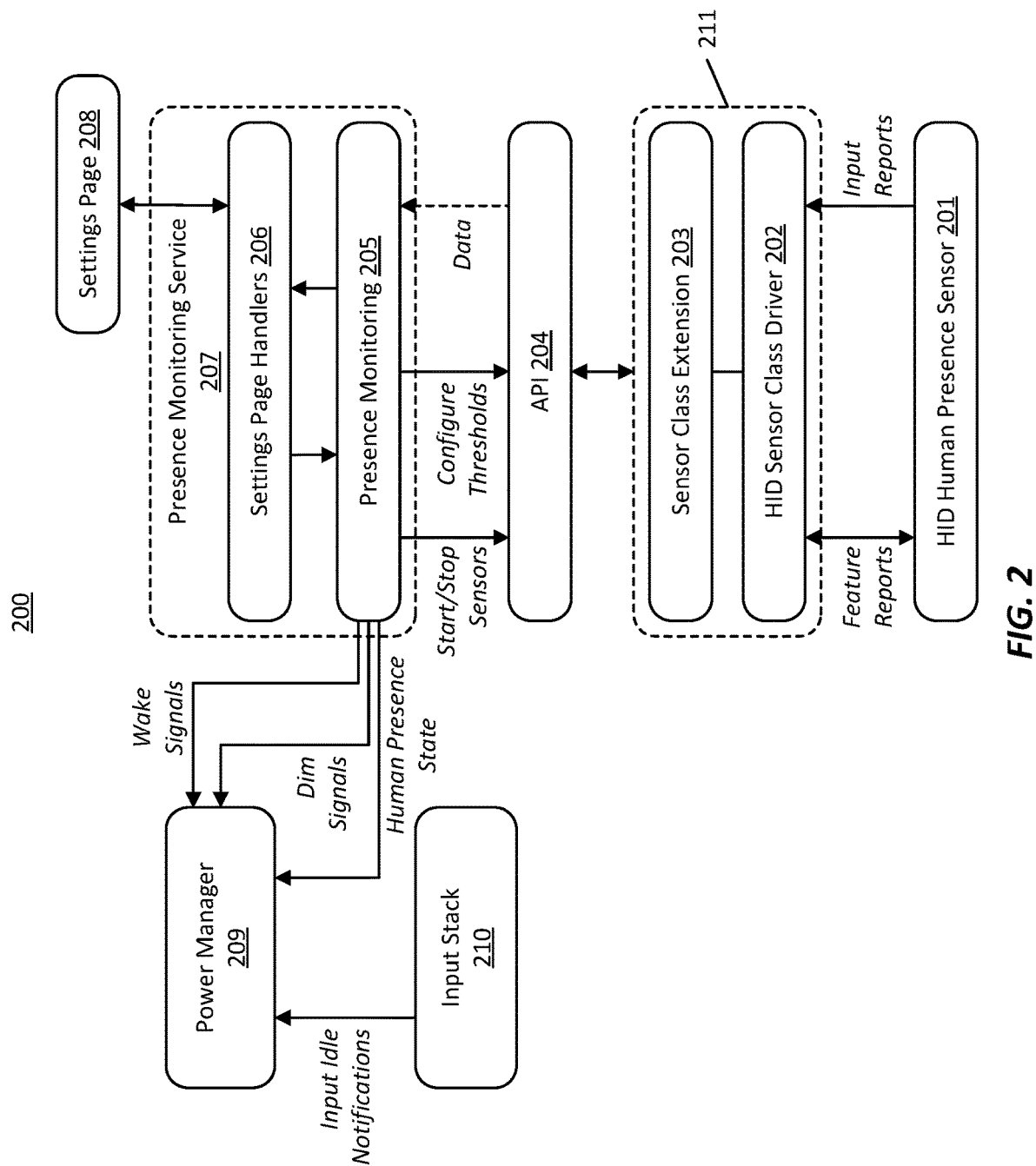
FIG. 2 illustrates an example of native OS support for human presence sensors.

In one example, presence monitoring service 113 is a presence monitoring service that uses presence sensors 105 to monitor a human presence state, and power manager 112 is a power manager that affects the power state of computer system 101 based on signals from the presence monitoring service. In this context, FIG. 2 illustrates example 200, which details one example of native OS support for presence sensors. In example 200, an HID human presence sensor 201 (e.g., presence sensor 105a, presence sensor 105b, presence sensor 105c) is a hardware device that detects human presence. In some embodiments, HID human presence sensor 201 is supplied by an IHV or OEM of computer system 101 (e.g., for an integrated presence sensor such as presence sensor 105a). In other embodiments, HID human presence sensor 201 is supplied by a user of computer system 101 (e.g., for an external presence sensor such as presence sensor 105b or presence sensor 105c). As shown in example 200, HID human presence sensor 201 communicates data (e.g., feature reports, input reports) with a presence sensor driver 211 (e.g., sensor driver 111). In example 200, presence sensor driver 211 is shown as including an HID sensor class driver 202 and a sensor class extension 203. In embodiments, sensor class extension 203 is an extension to HID sensor class driver 202 that provides HID class driver support for HID-based presence sensors.

Continuing with example 200, presence sensor driver 211 and a presence monitoring service 207 (e.g., presence monitoring service 113) communicate with each other via an API 204. As shown, this communication can include presence sensor driver 211 sending sensor payloads (e.g., human presence reports) to presence monitoring service 207 and presence monitoring service 207 configuring presence sensor driver 211 and/or HID human presence sensor 201 (e.g., start/stop sensor controls, thresholds). Presence monitoring service 207 includes a presence monitoring component 205 to monitor data (e.g., presence signals and reports) received from presence sensor driver 211, and settings page handlers 206 to facilitate operating a settings page 208 that allows an end-user to configure presence sensing features.

As shown in example 200, presence monitoring service 207 sends signals to a power manager 209 (e.g., power manager 112), such as a human presence state, a wake signal (e.g., for waking of computer system 101), and a dim signal (e.g., to dim a display). Together with idle notifications from an input stack 210, power manager 209 controls computer system 101 state based on human presence. For example, power manager 209 uses human presence to implement "wake on approach," "lock on leave," and "adaptive dimming" features.

Conventionally, presence sensors have had a limited ability to trigger computer system actions. For example, due at least in part to the challenge that a computer system may have more than one presence sensor and that the set of presence sensors available to a computer system can vary over time, presence sensors were previously only able to wake systems "lighter" low-power states, such as modern standby, and have not had the ability to trigger waking of a computer system from a deeper low-power (including hibernate) state, such as an S3 state or an S4 state.

The embodiments herein enable the arbitration of multiple presence sensor devices (e.g., presence sensors 105) to trigger actions at computer system 101, such as a wake from a deeper low-power (including hibernate) state based on a detected user presence. Some embodiments enable wake-up from a low-power sleep state based on enabling a wake-capable flag for an HID-based external presence sensor (e.g., presence sensor 105b, presence sensor 105c). In some embodiments, an external presence sensor (e.g., presence sensor 105c) is standalone. In other embodiments, an external presence sensor (e.g., presence sensor 105b) is part of a peripheral such as an external monitor (e.g., external device 122). In embodiments, the arbitration of multiple presence sensor devices to trigger actions at computer system 101 enables form factors like desktops and laptops to leverage features, such as "wake on approach" features, that were previously available only to devices having integrated presence sensors (e.g., laptops having their integrated presence sensor visible, e.g., by having their lid open). These embodiments enable computer system 101 to adapt to a dynamically-changing set of available presence sensors while enabling enhanced cooperation between those presence sensors and OS 110 (e.g., by enabling OS 110 to use presence sensors to wake computer system 101 from a deeper low-power state such as S3 or S4)

In FIG. 1, presence monitoring service 113 includes an arbitration component 118 that introduces logic to arbitrate between presence sensors 105 by automatically selecting one of those presence sensors based on its properties. This means that computer system 101 can dynamically utilize multiple presence sensors (e.g., presence sensors 105) rather than being limited to the use of a single presence sensor at a time. In embodiments, when enabling a presence sensor to wake a computer system from an S3 (or lower) state, arbitration between multiple presence sensors avoids creating spurious wakes from this S3 (or lower) state, which would otherwise cause unnecessary power drain and a poor end-user experience.

In embodiments, arbitration component 118 operates according to an arbitration policy. In one example arbitration policy, external presence sensors (e.g., presence sensor 105b, such as within an external monitor; presence sensor 105c) have priority over internal ones (e.g., presence sensor 105a, such as within a laptop lid). In embodiments, when an external presence sensor is connected to computer system 101, it completely replaces the internal presence sensor as input to wake and lock. In embodiments, "priority" in this context means that when an external presence sensor is connected, it becomes the default presence sensor for computer system 101. In embodiments, existing user preferences, such as timeout or detection distance, are transferred to the external presence sensor. In some embodiments, selection logic gives preference to the most recently connected external presence sensor.

FIG. 3 illustrates an example of an arbitration policy 300 for different presence sensor configurations. In arbitration policy 300, if no integrated or external presence sensor is present, then presence sensor-based wake and lock features are disabled. In arbitration policy 300, if an integrated presence sensor is present (e.g., presence sensor 105a) and no external presence sensor is present, then presence sensor-based wake and lock features are enabled. If, however, the integrated presence sensor is inactive (e.g., because a laptop's lid is closed), then the presence sensor-based wake and lock features are disabled. In arbitration policy 300, if a single external presence sensor is present (e.g., one of presence sensor 105b or presence sensor 105c), then that presence sensor becomes the default for presence sensor-based wake and lock features. If there is also an integrated presence sensor (e.g., presence sensor 105a), then the user can choose their preference between the two via a user interface (UI). Finally, in arbitration policy 300, if multiple external presence sensors are present (e.g., presence sensor 105b and presence sensor 105c), then the last connected external presence sensor becomes the default for presence sensor-based wake and lock features. However, the user can choose their preference via a UI.

In some examples of arbitration policies, a presence sensor can be designated as primary, with a higher rank, and the arbitration policy selects as active the presence sensor with the highest rank. In embodiments, if several presence sensors have the highest rank, the arbitration policy selects the first available presence sensor as active. In embodiments, presence sensors are ranked from highest to lowest priority as follows:
1) a presence sensor selected by an end-user;
2) an external presence sensor, which is part of a monitor container;
3) an external presence sensor, not part of a monitor container;
4) a primary internal presence sensor;
5) a non-primary internal presence sensor; and
6) when several presence sensors have the same rank, select the presence sensor which was connected last.

Figure 4:
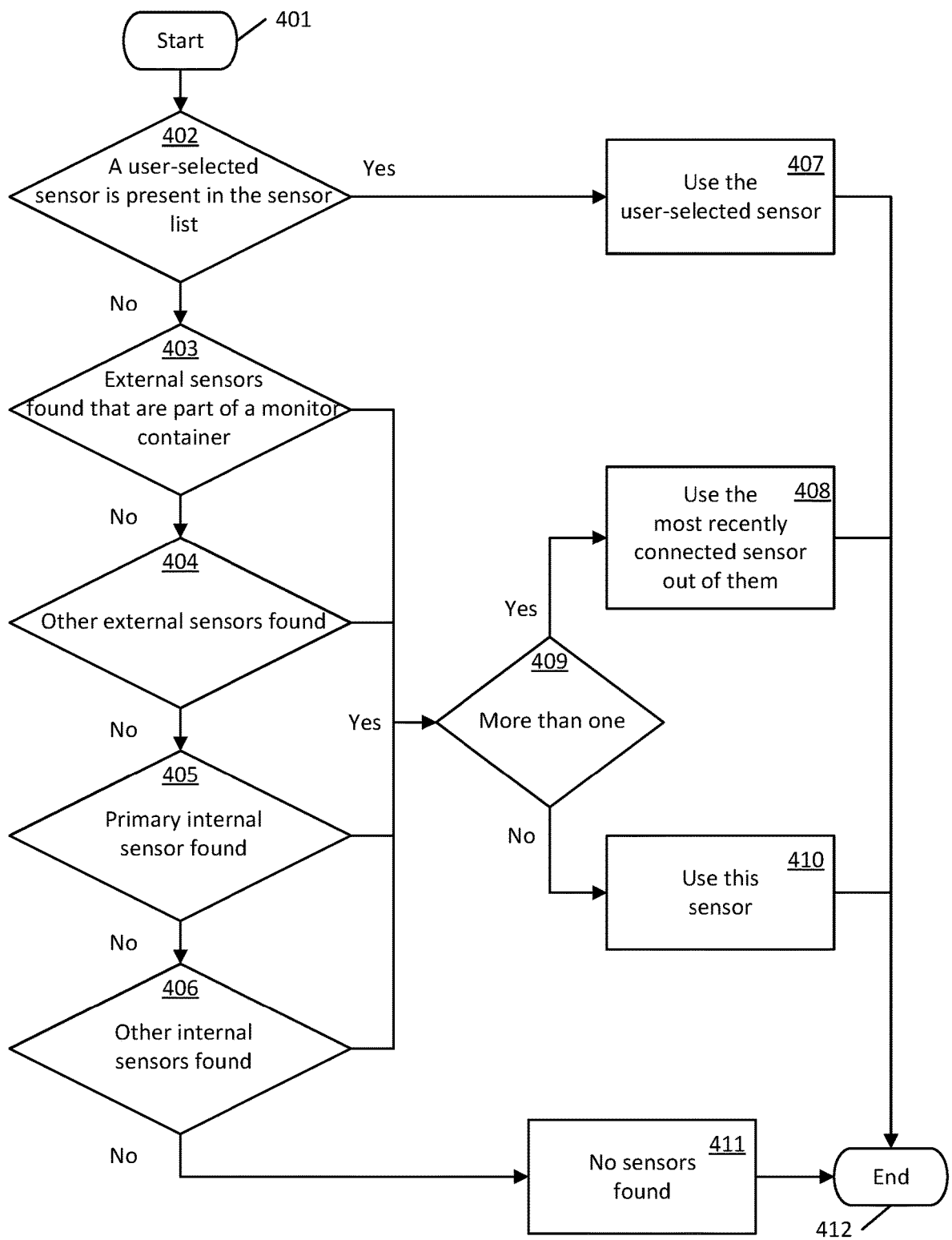
FIG. 4 illustrates an example of presence sensor selection logic.

FIG. 4 illustrates an example flowchart 400 demonstrating an example of presence sensor selection logic. After starting at block 401, arbitration component 118 determines at block 402 if a user-selected presence sensor is present in a list of available presence sensors (e.g., presence sensors 105). If so, flow proceeds to block 407, where arbitration component 118 determines that the user-selected presence sensor is to be used, with flowchart 400 then terminating at block 412.

In embodiments, if no user-selected presence sensor is present in a list of available presence sensors, flow proceeds to block 403, where arbitration component 118 determines if external presence sensors (e.g., presence sensor 105b) are found that are part of a monitor container (e.g., the external device 122). If so, flow proceeds to block 409.

If no external presence sensor that is part of a monitor container is found, flow proceeds to block 404, where arbitration component 118 determines if other external presence sensors (e.g., presence sensor 105c) are found. If so, flow proceeds to block 409.

If no other external presence sensors are found, flow proceeds to block 405, where arbitration component 118 determines if a primary internal presence sensor (e.g., presence sensor 105a) is found. If so, flow proceeds to block 409.

If not, flow proceeds to block 406, where arbitration component 118 determines if other internal presence sensors are found. If so, flow proceeds to block 409.

If no other internal presence sensors are found, flow proceeds to block 411, where arbitration component 118 determines that no presence sensors are found, with flowchart 400 then terminating at block 412.

Turning to block 409, arbitration component 118 determines if more than one presence sensor of the same category is available (e.g., based on finding multiple sensors at one of block 403, block 404, block 405, or block 406). If so, flow proceeds to block 408, where arbitration component 118 determines to use the most recently connected sensor in the category, with flowchart 400 then terminating at block 412.

If there is only one presence sensor available, flow proceeds to block 410, where arbitration component 118 determines to use the single sensor, with flowchart 400 then terminating at block 412.

As mentioned, prior lack of OS support for presence sensors led to a patchwork of hardware and software solutions from IHVs and OEMs, resulting in a lack of uniformity in how presence sensors are utilized and how related functionality is configured. For example, IVHs and OEMs have conventionally provided presence sensor configuration via third-party applications (e.g., the application 115). In some situations, these configuration options have overlapped with, or duplicated, OS-level settings, leading to inconsistency and end-user confusion. To address this challenge, embodiments are further directed to a settings synchronization architecture and process that enables OS-level presence sensor settings to be synchronized with an application that includes presence sensor settings. These embodiments improve an end-user experience by enabling the end-user to view and change presence sensor settings from either an OS-level settings application (e.g., settings component 114) or from another settings application (e.g., settings component 121 of application 115) while ensuring continuity between the two applications.

In FIG. 1, presence monitoring service 113 includes a synchronization component 119 that enables settings synchronization between settings component 114 of OS 110 and settings component 121 of application 115. In one embodiment, for any presence sensor settings that are common between settings component 114 and settings component 121, those settings are synchronized between settings component 114 and application 115. For security, in embodiments, settings component 114 only synchronizes with third-party applications that are on an allow list.

Figure 5A:
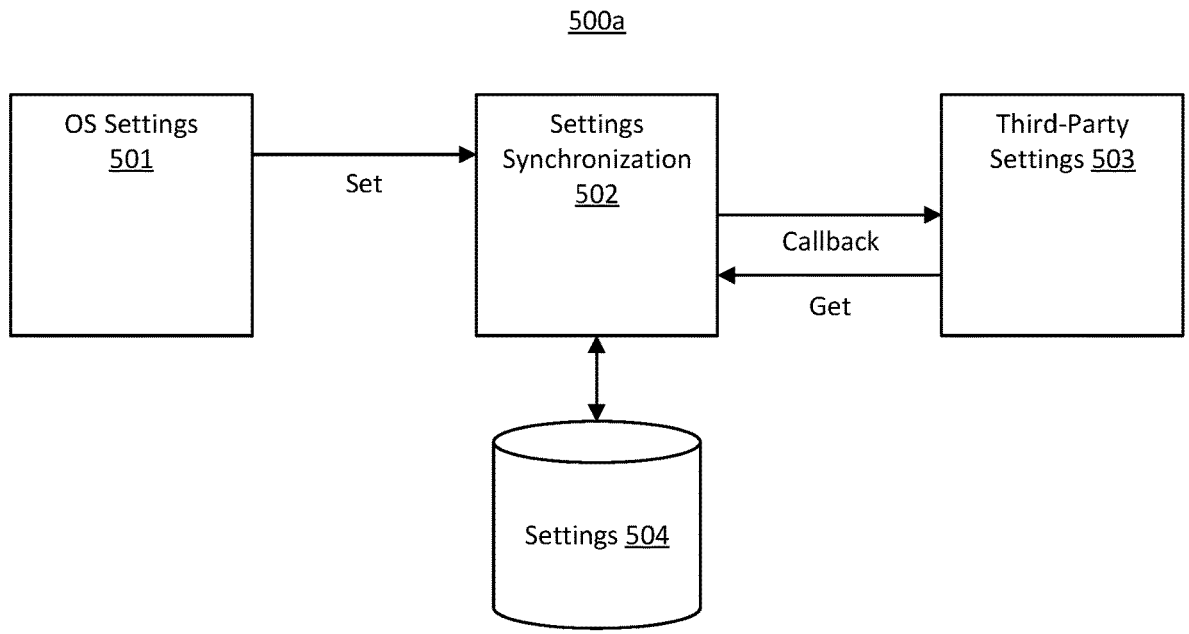
FIGS. 5A and 5B illustrate an example of human presence sensor settings synchronization between OS-level settings and another application.
Figure 5B:
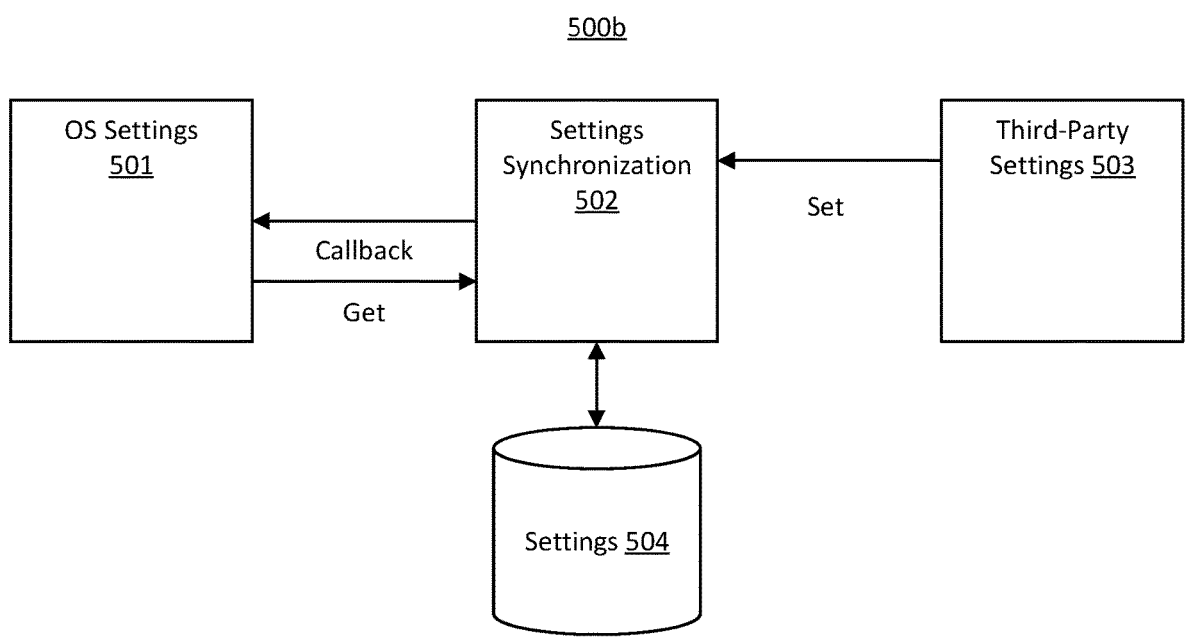

For example, FIGS. 5A and 5B illustrate an example of human presence sensor settings synchronization between OS-level settings and another application, such as a third-party application. Initially, FIG. 5A illustrates an example 500a that includes OS settings 501 (e.g., settings component 114), third-party settings 503 (e.g., settings component 121), and a settings synchronization component 502 (e.g., synchronization component 119) that manages a database of settings 504 (e.g., presence sensor settings). As shown in example 500a, when a change is made to OS settings 501, embodiments notify settings synchronization component 502 that a setting has been set. Based on this notification, settings synchronization component 502 initiates a callback to third-party settings 503, which triggers third-party settings 503 to interact with settings synchronization component 502 to get the updated setting. In some embodiments, the callback notifies third-party settings 503 of the particular setting that was changed, and third-party settings 503 initiates a get for only that setting. In other embodiments, the callback notifies third-party settings 503 that a setting change was made generally, and third-party settings 503 initiates gets for a plurality of settings (e.g., all presence sensing settings).

FIG. 5B illustrates an example 500b of the inverse, in which OS 110 synchronizes with a settings change made by settings component 121 of application 115. As shown in example 500b, when a change is made to third-party settings 503, embodiments notify settings synchronization component 502 that a setting has been set. Based on this notification, settings synchronization component 502 initiates a callback to OS settings 501, which triggers OS settings 501 to interact with settings synchronization component 502 to get the updated setting. In some embodiments, the callback notifies OS settings 501 of the particular setting that was changed, and OS settings 501 initiates a get for only that setting. In other embodiments, the callback notifies OS settings 501 that a setting change was made generally, and OS settings 501 initiates gets for a plurality of settings (e.g., all presence sensing settings).

Embodiments also integrate a link to application 115 (or to settings component 121) within a settings UI. These embodiments enable an end-user to quickly access and configure presence sensor settings that are available from settings component 121, but that may not be exposed by settings component 114. In embodiments, settings component 114 refers to application 115 by reference to an application store package name or identifier. Based on this application store package name or identifier, settings component 114 either links directly to application 115 (e.g., if application 115 is installed) or links to an application store page for application 115 (e.g., if application 115 is not installed). In embodiments, settings component 114 obtains the application store package name or identifier from a vendor-provided driver (e.g., sensor driver 111). In embodiments, for security, settings component 114 only integrates with third-party applications that are on an allow list.

Figure 6:
FIG. 6 illustrates an example of a settings user interface for human presence-sensing behaviors.

FIG. 6 illustrates an example of a settings UI 600 for human presence sensing behaviors. In embodiments, settings component 114 generates settings UI 600. In the example, settings UI 600 includes section 601 for setting behaviors relating to the detection that a human is no longer present. In the example, settings UI 600 also includes section 602 for setting behaviors relating to a detection that a human has become present. In the example, settings UI 600 also includes section 603 for setting behaviors relating to the detection that a human's attention (e.g., gaze) is lost. In the example, settings UI 600 also includes section 604 for choosing a preferred presence sensor (e.g., among presence sensors 105). In the example, settings UI 600 also includes section 605 for linking to application 115 either directly or via an application store.

Notably, by enabling application 115 to synchronize with settings component 114 while also providing a mechanism to integrate the launching of application 115 from a settings UI (e.g., generated by settings component 114), embodiments enable IHVs and OEMs to differentiate their devices with new features, while also leveraging settings component 114. This means that end-users of OS 110 are able to manage and control human presence features, starting with settings component 114 as the go-to entry point.

Currently, end-users have no way to control the presence sensor-related data that is collected or processed by applications on a computer system. In some situations, IHVs and OEMs collect consent as part of large end-user agreements that are not transparent to the user, with the user having no visibility or control over the data collected. To address these security drawbacks, embodiments introduce a security architecture and process that enables an end-user to configure access to presence sensor data on a per-application basis. This improves end-user security and transparency by providing the end-user the ability to individually restrict which applications can access presence sensor data and by providing the end-user visibility into which applications are accessing presence sensor data.

In FIG. 1, presence monitoring service 113 includes a security component 120 that provides for application-level control of information collected by presence sensors 105. In embodiments, security component 120 supports user privacy controls for presence sensors 105 by providing a novel way for applications to request and for users to control the attention and presence information collected and processed by applications (e.g., the application 115) and presence sensors 105 on computer system 101. In embodiments, security component 120 includes a capability access management system that checks whether applications possess user consent to collect this information and then grants or denies applications access to presence sensor data.

Some embodiments provide a privacy settings UI (e.g., settings component 114, settings page 208) for human presence features so that end-users can control application access to presence sensors. This UI provides full transparency on sensitive information access for end-users. In embodiments, these settings can also be controlled by mobile device management (MDM) policies and/or by group policy. In some embodiments, a privacy settings UI also provides visibility into which applications have accessed human presence data (e.g., within a defined time frame, such as seven days).

FIG. 7 illustrates an example of a settings UI 700 for human presence sensing privacy. For example, the settings UI 700 enables an end-user to control application access to presence sensor data. In embodiments, settings component 114 generates settings UI 700. In the example, the settings UI 700 includes section 701, which enables an end-user to globally enable or disable presence sensor access. In the example, settings UI 700 also includes section 702, which enables an end-user to choose to grant installed applications access to presence sensor data, including the ability to individually select which of these applications are permitted or denied access to presence sensor data. In the example, settings UI 700 also includes section 703, which enables an end-user to choose to grant OS-integrated applications access to presence sensor data, including the ability to individually select which of these applications are permitted or denied access to presence sensor data. In embodiments, settings component 114 populates section 702 and section 703 with applications that have requested access to presence sensor data, thereby enabling an end-user to individually grant or deny each application's request. In some embodiments, applications can be granted access to presence sensor data based on a group policy (e.g., as specified by a system administrator). As shown in settings UI 700, section 702 and section 703 indicate when various applications last accessed presence sensor data. However, the settings UI 700 also includes section 704, which provides a more extensive log of presence sensor access. In embodiments, settings UI 700 also includes section 705 for accessing human presence sensing settings (e.g., settings UI 600).

Figure 8:
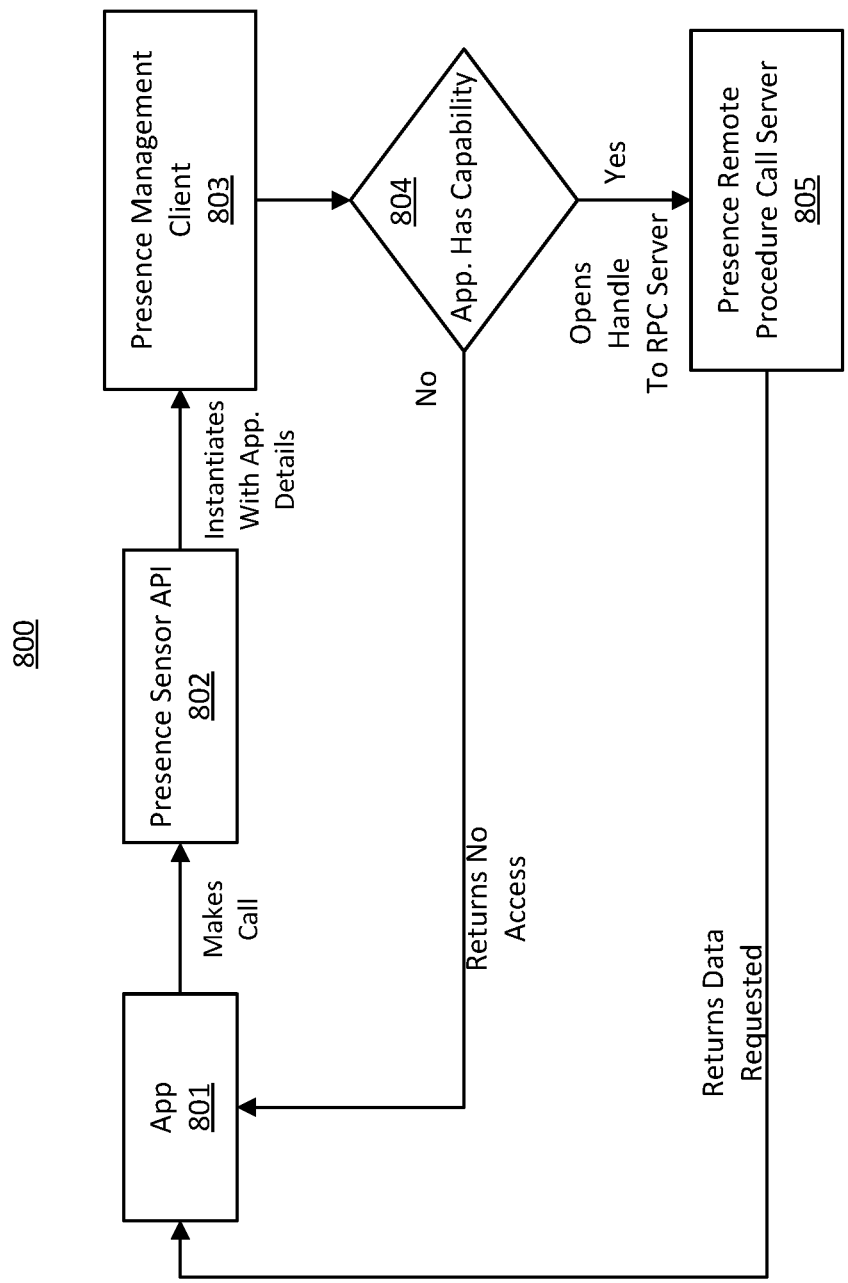
FIG. 8 illustrates an example of capability-gated application programming interface access to a presence sensor.

In embodiments, depending on an application's access settings in settings UI 700, the application may be granted or denied access to presence sensor data upon an API request. FIG. 8 illustrates an example 800 of capability-gated API access to a presence sensor, as orchestrated by security component 120. In example 800, application 801 makes an API call to a presence sensor API 802, requesting access to presence sensor data. The presence sensor API 802 then instantiates a presence management client 803 with application details. Presence management client 803, in turn, determines at block 804 if the application has a capability (e.g., a human presence capability or a custom capability). If so, presence management client 803 opens a remote procedure call (RPC) handle to a presence RPC server 805, which returns the requested data. If not, presence management client 803 returns no access.

Figure 9:
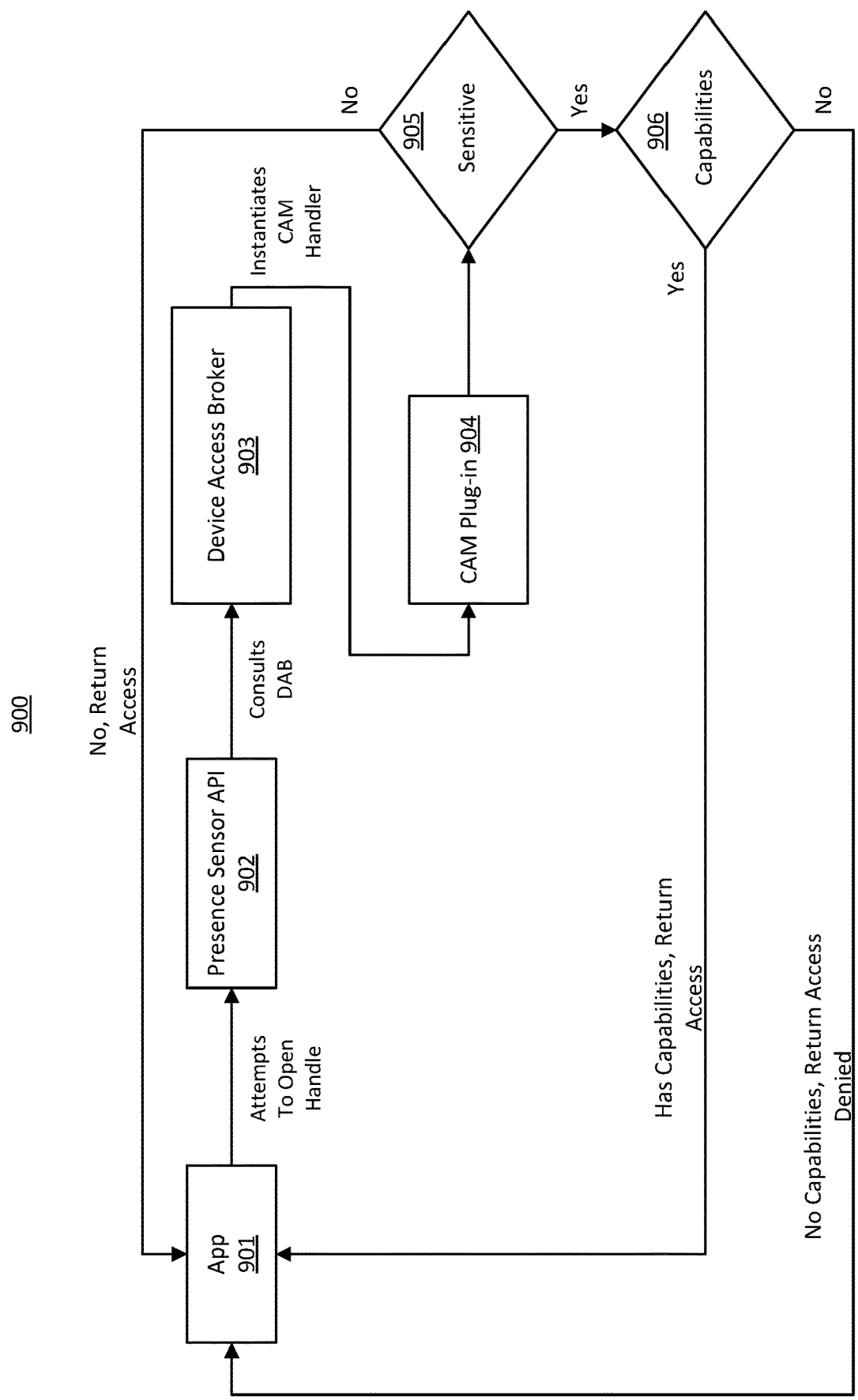
FIG. 9 illustrates an example of a capability-gated opening of a handle for a presence sensor.

In embodiments, depending on an application's access settings in the settings UI 700, the application may be granted or denied opening of a handle to a presence sensor. FIG. 9 illustrates an example 900 of a capability-gated opening of a handle to a presence sensor, as orchestrated by security component 120. In example 900, application 901 calls a presence sensor API 902 and attempts to open a handle to a presence sensor. The presence sensor API 902 consults a data access broker (DAB), DAB 903. The DAB 903, in turn, instantiates a capability access manager (CAM) plug-in, CAM plug-in 904. At block 905, the CAM plug-in 904 determines if the requested presence sensor is sensitive. If not, CAM plug-in 904 returns a handle to application 901 that provides access to the requested presence sensor. If the presence sensor is sensitive, at block 906, CAM plug-in 904 determines if the application 901 has required capabilities (e.g., is granted access, per settings UI 700). If so, CAM plug-in 904 returns a handle to application 901 that provides access to the requested presence sensor. If not, CAM plug-in 904 denies access.

The following discussion now refers to a number of methods and method acts. Although the method acts are discussed in specific orders or are illustrated in a flow chart as occurring in a particular order, no order is required unless expressly stated or required because an act is dependent on another act being completed prior to the act being performed.

Figure 10:
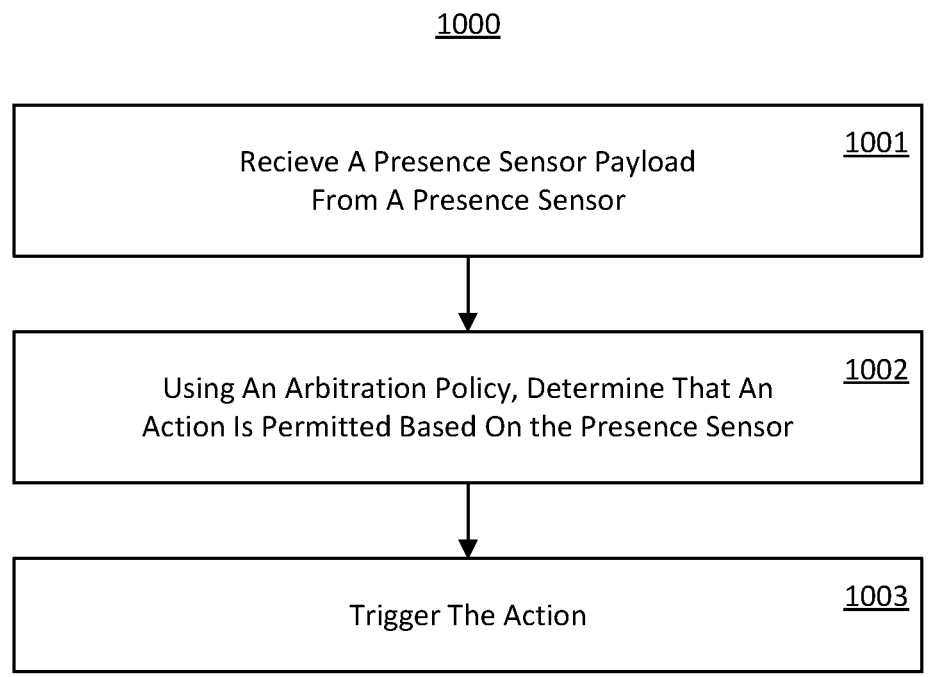
FIG. 10 illustrates a flow chart of an example of a method for arbitrating between a plurality of human presence sensors.

FIG. 10 illustrates a flow chart of an example method 1000 for arbitrating between a plurality of human presence sensors. In embodiments, instructions for implementing method 1000 are encoded as computer-executable instructions (e.g., arbitration component 118) stored on a computer storage media (e.g., storage medium 104) that are executable by a processor (e.g., processor system 102) to cause a computer system (e.g., computer system 101) to perform method 1000.

Referring to FIG. 10, in embodiments, method 1000 comprises act 1001 of receiving a presence sensor payload from a presence sensor. In some embodiments, act 1001 comprises receiving a sensor payload from a human presence sensor that is associated with the computer system. For example, presence monitoring service 113 receives a presence sensor payload from sensor driver 111 based on data gathered by presence sensor 105*b*. In embodiments, the content of the sensor payload indicates a human presence at computer system 101.

Method 1000 comprises act 1002 of, using an arbitration policy, determining that an action is permitted based on the presence sensor. In some embodiments, act 1002 comprises determining, based on an arbitration policy, that the computer system is enabled to perform a particular action based on a priority of the human presence sensor. For example, arbitration component 118 uses an arbitration policy to determine if a particular action is permitted based on data from presence sensor 105*b*. In one example, the particular action is controlling a power state of a hardware device (e.g., processor system 102) at computer system 101. In another example, the particular action is controlling the computer system's lock state (e.g., OS 110).

In embodiments, the arbitration policy determines the priority of the human presence sensor among a plurality of human presence sensors that are associated with the computer system (e.g., presence sensor 105*a*, presence sensor 105*b*, and presence sensor 105*c*). Example arbitration policies were presented in connection with FIG. 3 and FIG. 4. For example, these arbitration policies prefer a human presence sensor that is external to the computer system (e.g., presence sensor 105*b* or presence sensor 105*c*) over a second human presence sensor that is integrated into the computer system (e.g., presence sensor 105*a*); prefer a user-selected human presence sensor; prefer an external human presence sensor that is part of a monitor container (e.g., presence sensor 105*b*) over an external human presence sensor that is standalone (e.g., presence sensor 105*c*), and the like.

Method 1000 comprises act 1003 of triggering the action. In some embodiments, act 1003 comprises triggering the particular action based on the computer system being enabled to perform the particular action based on the content of the sensor payload. For example, presence monitoring service 113 triggers an action by power manager 112 or some other component of OS 110.

In some examples, controlling the power state of a hardware device at computer system 101 could comprise the triggering of the processor system 102 to wake from an S3 state or an S4 state based on the sensor payload indicating an approach of a human, or the triggering of the processor system 102 to enter an S3 state or an S4 state based on the sensor payload indicating a departure of a human.

In other examples, controlling the computer system lock state comprises unlocking the computer system based on the sensor payload indicating an approach of a human, or locking the computer system based on the sensor payload indicating a departure of a human.

Figure 11:
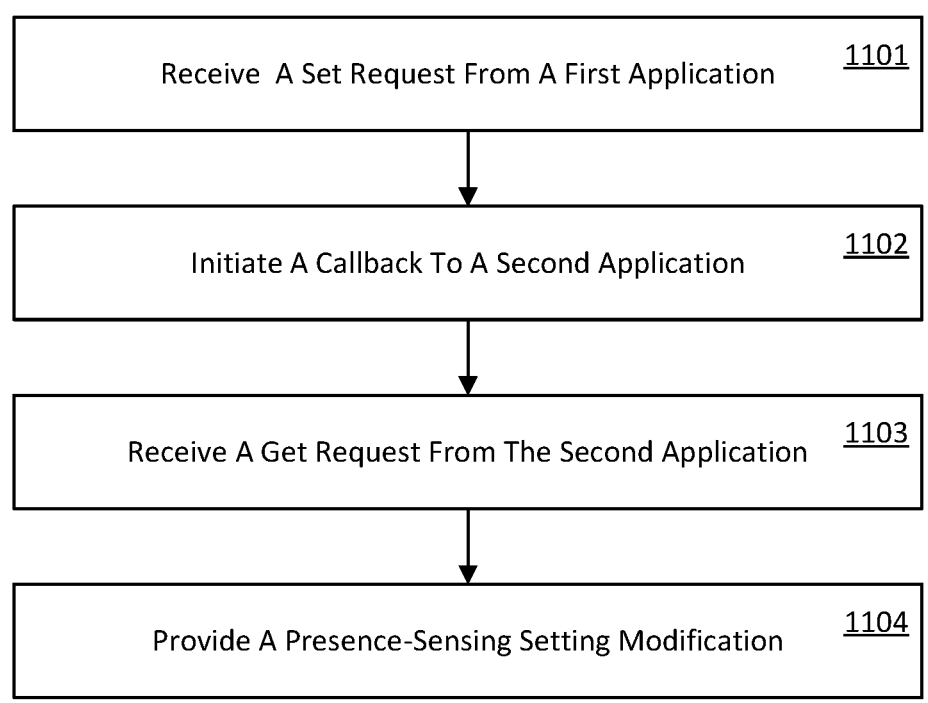
FIG. 11 illustrates a flow chart of an example of a method for synchronizing a presence-sensing setting between an OS settings application and a third-party application.

FIG. 11 illustrates a flow chart of an example method 1100 for synchronizing a presence-sensing setting between an OS settings application and a third-party application. In embodiments, instructions for implementing method 1100 are encoded as computer-executable instructions (e.g., synchronization component 119) stored on a computer storage media (e.g., storage medium 104) that are executable by a processor (e.g., processor system 102) to cause a computer system (e.g., computer system 101) to perform method 1100.

Referring to FIG. 11, in embodiments, method 1100 comprises act 1101 of receiving a set request from a first application. In some embodiments, act 1101 comprises receiving a set request from a first application, the set request specifying a value of a presence-sensing setting. In a first example, and in reference to FIG. 5A, OS settings 501 (e.g., the first application) sends a set request (e.g., a request to set a setting) to settings synchronization component 502. In a second example, and in reference to FIG. 5B, third-party settings 503 (e.g., the first application) sends a set request to settings synchronization component 502.

Method 1100 comprises act 1102 of initiating a callback to a second application. In some embodiments, act 1102 comprises initiating a callback to a second application, the callback indicating a presence-sensing settings modification. Continuing the first example, settings synchronization component 502 sends a callback to third-party settings 503 (e.g., the second application). Continuing the second example, settings synchronization component 502 sends a callback to OS settings 501 (e.g., the second application).

In some examples, the callback indicates the particular presence-sensing setting that was changed. In other examples, the callback indicates that presence-sensing settings were changed generally.

Method 1100 comprises act 1103 of receiving a get request from the second application. In some embodiments, act 1103 comprises receiving a get request from the second application initiating the callback. Continuing the first example, third-party settings 503 sends a get request (e.g., a request to get a setting) to settings synchronization component 502. Continuing the second example, OS settings 501 sends a get request to settings synchronization component 502.

Method 1100 comprises act 1104 of providing a presence-sensing setting modification. In some embodiments, act 1104 comprises providing the second application with the value of the presence-sensing setting. Continuing the first example, settings synchronization component 502 synchronizes settings 504 with third-party settings 503. Continuing the second example, settings synchronization component 502 synchronizes settings 504 with OS settings 501.

Figure 12:
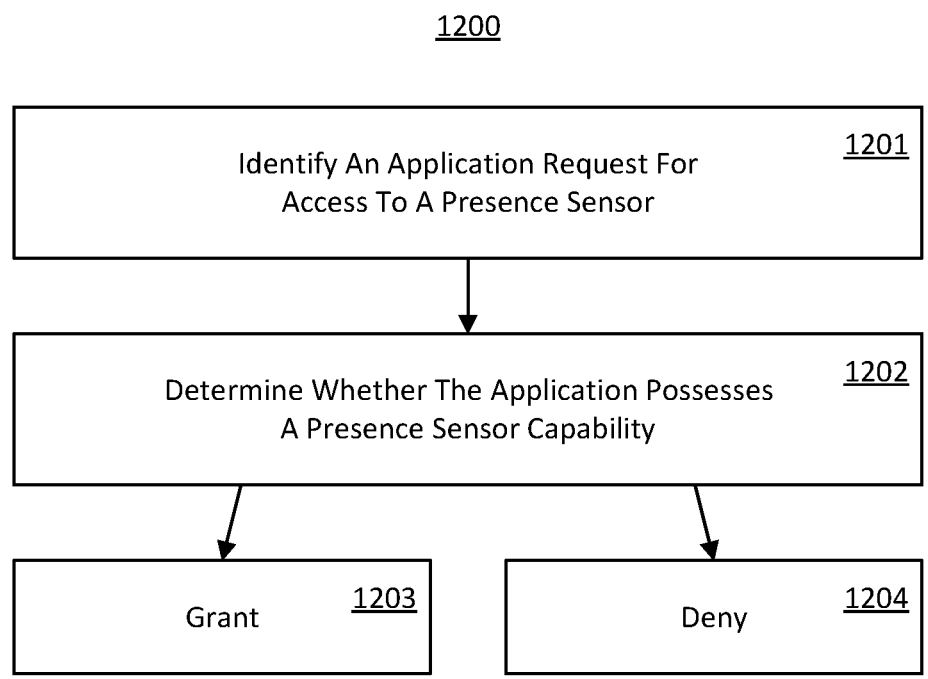
FIG. 12 illustrates a flow chart of an example of a method for managing per-application access to a human presence sensor.

FIG. 12 illustrates a flow chart of an example method 1200 for managing per-application access to a human presence sensor. In embodiments, instructions for implementing method 1200 are encoded as computer-executable instructions (e.g., security component 120) stored on a computer storage media (e.g., storage medium 104) that are executable by a processor (e.g., processor system 102) to cause a computer system (e.g., computer system 101) to perform method 1200.

Referring to FIG. 12, in embodiments, method 1200 comprises act 1201 of identifying an application request for access to a presence sensor. In some embodiments, act 1201 comprises identifying a request from an application for access to a human presence sensor. For example, security component 120 identifies a request by an application, such as application 115, to access one of presence sensors 105.

Method 1200 comprises act 1202 of determining whether the application possesses a presence sensor capability. In some embodiments, act 1202 comprises determining that the application possesses a presence sensor capability. For example, in settings UI 700, "Sensor Explorer," "Store," and "Photos" are each granted presence sensing access. In other embodiments, act 1202 comprises determining that the application lacks the presence sensor capability. For example, in settings UI 700, "Camera" is denied presence sensing access.

Method 1200 comprises act 1203 of granting the request. In some embodiments, act 1203 comprises granting, to the application, access to the human presence sensor. For example, based on the settings shown in settings UI 700, security component 120 would grant "Sensor Explorer," "Store," and "Photos" access to the requested presence sensor. In embodiments, method 1200 further comprises logging an indication of granting access to the human presence sensor. For example, settings UI 700 shows each application's last presence sensor access.

Method 1200 comprises act 1204 of denying the request. In some embodiments, act 1203 comprises denying, from the application, access to the human presence sensor. For example, based on the settings shown in settings UI 700, security component 120 would deny "Camera" access to the requested presence sensor.

In some embodiments, such as those described in connection with FIG. 8, security component 120 regulates an application's APIs access to presences sensors. Thus, in embodiments, the request is a request for API access to the human presence sensor. In other embodiments, such as those described in connection with FIG. 9, security component 120 regulates an application's access to presence sensor handles. Thus, in embodiments, the request is a request for a handle for the human presence sensor.

Notably, methods 1000, 1100, and 1200 can be performed individually or in combination.

Embodiments of the disclosure may comprise or utilize a special-purpose or general-purpose computer system (e.g., computer system 101) that includes computer hardware, such as, for example, a processor system (e.g., processor system 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media (e.g., storage medium 104). Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EE-PROM), solid state drives (SSDs), flash memory, phase-change memory (PCM), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media can include a network and/or data links that carry program code in the form of computer-executable instructions or data structures that are accessible by a general-purpose or special-purpose computer system. A "network" is defined as one or more data links that enable the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 106) and eventually transferred to computer system RAM and/or less volatile computer storage media at a computer system. Thus, computer storage media can be included in computer system components that also (or even primarily) utilize transmission media.

Computer-executable instructions comprise, for example, instructions and data which, when executed at a processor system, cause a general-purpose computer system, a special-purpose computer system, or a special-purpose processing device to perform a function or group of functions. Computer-executable instructions may be, for example, binaries, intermediate format instructions (e.g., assembly language), or source code.

The disclosed systems and methods may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosed systems and methods may also be practiced in distributed system environments (e.g., where hardwired and/or wireless data links connect local and remote computer systems) both perform tasks. As such, in a distributed system environment, a computer system may include a plurality of constituent computer systems. Program modules may be located in local and remote memory storage devices in a distributed system environment.

The embodiments of the disclosure may be practiced in a cloud computing environment. Cloud computing environments may be distributed, although this is not required. Cloud computing environments may be distributed internationally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (Saas), Platform as a Service (PaaS), and Infrastructure as a Service (IaaS). The cloud computing model may also be deployed using different deployment models such as private cloud, community cloud, public cloud, hybrid cloud, etc.

Some embodiments, such as a cloud computing environment, may comprise a system with one or more hosts capable of running one or more virtual machines. During operation, virtual machines emulate an operational computing system, supporting an OS and perhaps one or more other applications. In some embodiments, each host includes a hypervisor that emulates virtual resources for the virtual machines using physical resources that are abstracted from the view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method implemented at a computer system that includes a processor system comprising:
receiving a sensor payload from a human presence sensor that is associated with the computer system;
determining, based on an arbitration policy, that the computer system is enabled to perform a particular action based on the human presence sensor having priority among a plurality of human presence sensors that are associated with the computer system, wherein the arbitration policy determines that the human presence sensor has priority among the plurality of human presence sensors that are associated with the computer system by determining that the human presence sensor either,
is a most recently connected human presence sensor among two or more human presence sensors having a same ranking, or
has a higher ranking than one or more other human presence sensors; and
triggering the particular action based on the computer system being enabled to perform the particular action based on content of the sensor payload.

2. The method of claim 1, wherein the particular action is controlling a power state of a hardware device at the computer system.

3. The method of claim 1, wherein the particular action is controlling a computer system lock state.

4. The method of claim 1, wherein the arbitration policy ranks a first human presence sensor that is external to the computer system higher than a second human presence sensor that is integrated into the computer system.

5. The method of claim 1, wherein the arbitration policy ranks a first human presence sensor that is user-selected higher than a second human presence sensor that is not user-selected.

6. The method of claim 1, wherein the arbitration policy ranks a first external human presence sensor that is part of a monitor container higher than a second external human presence sensor that is standalone.

7. The method of claim 1, wherein the content of the sensor payload indicates a human presence at the computer system.

8. The method of claim 2, wherein controlling the power state of the hardware device at the computer system comprises triggering the processor system to wake from a system power state three (S3) state or a system power state four (S4) state, based on the sensor payload indicating an approach of a human.

9. The method of claim 2, wherein controlling the power state of the hardware device at the computer system comprises triggering the processor system to enter a system power state three (S3) state or a system power state four (S4) state, based on the sensor payload indicating a departure of a human.

10. The method of claim 3, wherein controlling the computer system lock state comprises unlocking the computer system, based on the sensor payload indicating an approach of a human.

11. The method of claim 3, wherein controlling the computer system lock state comprises locking the computer system, based on the sensor payload indicating a departure of a human.

12. A computer system, comprising:
a processor system; and
a computer storage medium that stores computer-executable instructions that are executable by the processor system to at least:
receive a sensor payload from a human presence sensor that is associated with the computer system;
determine, based on an arbitration policy, that the computer system is enabled to perform a particular action based on the human presence sensor having priority among a plurality of human presence sensors that are associated with the computer system, wherein the arbitration policy determines that the human presence sensor has priority among the plurality of human presence sensors that are associated with the computer system by determining that the human presence sensor either,
is a most recently connected human presence sensor among two or more human presence sensors having a same ranking, or
has a higher ranking than one or more other human presence sensors; and
trigger the particular action based on the computer system being enabled to perform the particular action based on content of the sensor payload.

13. The computer system of claim 12, wherein the particular action is controlling a power state of a hardware device at the computer system, including at least one of:
triggering the processor system to wake from a system power state three (S3) state or a system power state four (S4) state, based on the sensor payload indicating an approach of a human; or
triggering the processor system to enter a system power state three (S3) state or a system power state four (S4) state, based on the sensor payload indicating a departure of a human.

14. The computer system of claim 12, wherein the particular action is controlling a computer system lock state, including at least one of:
unlocking the computer system, based on the sensor payload indicating an approach of a human; or
locking the computer system, based on the sensor payload indicating a departure of a human.

15. The computer system of claim 12, wherein the arbitration policy ranks a first human presence sensor that is external to the computer system higher than a second human presence sensor that is integrated into the computer system.

16. The computer system of claim 12, wherein the arbitration policy ranks a first human presence sensor that is user-selected higher than a second human presence sensor that is not user-selected.

17. The computer system of claim 12, wherein the arbitration policy ranks a first external human presence sensor that is part of a monitor container higher than a second external human presence sensor that is standalone.

18. A computer storage medium that stores computer-executable instructions that are executable by a processor system to at least:
receive a sensor payload from a human presence sensor that is associated with the computer system;
determine, based on an arbitration policy, that the computer system is enabled to perform a particular action based on the human presence sensor having priority among a plurality of human presence sensors that are associated with the computer system, wherein the arbitration policy determines that the human presence sensor has priority among the plurality of human presence sensors that are associated with the computer system by determining that the human presence sensor either,
is a most recently connected human presence sensor among two or more human presence sensors having a same ranking, or
has a higher ranking than one or more other human presence sensors; and
trigger the particular action based on the computer system being enabled to perform the particular action based on content of the sensor payload.

19. The computer storage medium of claim 18, wherein the particular action is controlling a power state of a hardware device at the computer system or controlling a computer system lock state.

20. The computer storage medium of claim 18, wherein the arbitration policy:
ranks a first human presence sensor that is external to the computer system higher than a second human presence sensor that is integrated into the computer system;
ranks a first human presence sensor that is user-selected higher than a second human presence sensor that is not user-selected; or ranks a first external human presence sensor that is part of a monitor container higher than a second external human presence sensor that is standalone.

\* \* \* \* \*